(12) United States Patent
Cloninger et al.

(10) Patent No.: US 10,197,758 B2
(45) Date of Patent: Feb. 5, 2019

(54) MICRO-DUCT RECLAMATION COMPRESSION COUPLING

(71) Applicants: David Michael Cloninger, Gardnerville, NV (US); Todd Michael Boelter, Gardnerville, NV (US)

(72) Inventors: David Michael Cloninger, Gardnerville, NV (US); Todd Michael Boelter, Gardnerville, NV (US)

( * ) Notice: Subject to any disclaimer, the term of this patent is extended or adjusted under 35 U.S.C. 154(b) by 192 days.

(21) Appl. No.: 15/330,072

(22) Filed: Aug. 2, 2016

(65) Prior Publication Data

US 2018/0038526 A1 Feb. 8, 2018

(51) Int. Cl.
*G02B 6/44* (2006.01)
*F16L 15/08* (2006.01)

(52) U.S. Cl.
CPC ............ *G02B 6/4459* (2013.01); *F16L 15/08* (2013.01)

(58) Field of Classification Search
CPC ......... F16L 15/08; F16L 19/083; F16L 19/10; F16L 19/06; F16L 37/088; G02B 6/4459
USPC ................ 285/339, 389, 343, 333, 249, 342
See application file for complete search history.

(56) References Cited

U.S. PATENT DOCUMENTS

| | | | | |
|---|---|---|---|---|
| 2,837,353 A | * | 6/1958 | Ashbrook | F16L 19/06 285/342 X |
| 3,248,135 A | * | 4/1966 | Meripol | 285/343 X |
| 4,438,953 A | * | 3/1984 | Timme, Jr. | F16L 15/08 285/333 X |
| 2011/0109080 A1 | * | 5/2011 | Christensen | |

* cited by examiner

*Primary Examiner* — Greg Binda
*Assistant Examiner* — Zachary T Dragicevich

(57) ABSTRACT

A sleeved compression micro-duct reclamation coupling which is utilized for interconnecting remnants of micro-duct and is of a sufficient size and shape to allow the interconnected micro-duct to be pulled through larger ducting for underground construction. The sleeved compression micro-duct reclamation coupling is easily installed without the need for tools and provides a strong connection which will not easily disengage while the micro-duct is pulled through larger ducting. The sleeved compression micro-duct reclamation coupling is of simple construction requiring only a male half section, a female half section and two slotted compression sleeves.

1 Claim, 2 Drawing Sheets

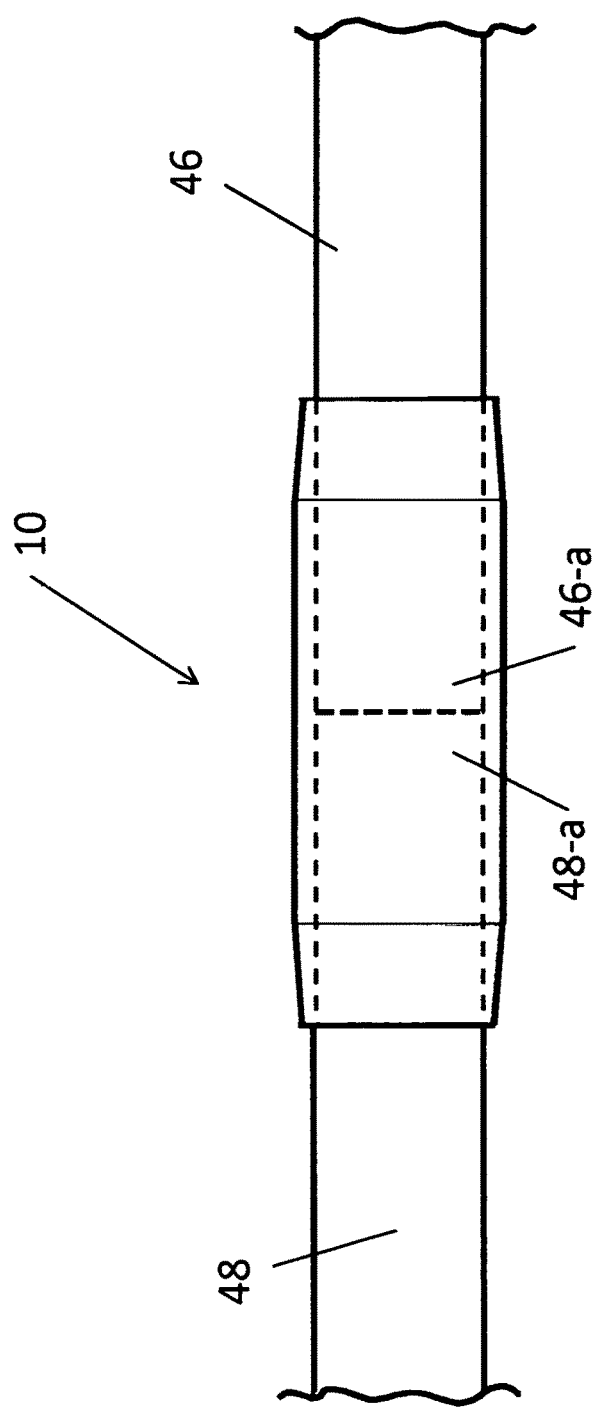

MICRO-DUCT RECLAMATION COMPRESSION COUPLING

FIELD OF THE INVENTION

The present invention relates in general to couplings used to interconnect and reclaim partial reels of micro-duct. More particularly the invention pertains to a new and novel micro-duct reclamation compression coupling which is easily installed and provides a strong connection which will not easily disengage while the micro-duct is pulled through larger ducting for underground construction.

BACKGROUND OF THE INVENTION

A micro-duct is a small conduit used for the installation of fiber optic cables In general. They have a size ranging from typically 3 to 16 mm and are installed as bundles in larger ducts. Micro-duct are typically of small diameter, flexible, or semi-flexible ducts designed to provide clean, continuous, low friction paths for placing optical cables that have relatively low pulling tension limits. Micro-duct is stored and sold on reels. Thus, most often there are unused remnants of micro-duct which cannot be used as they are not of a sufficient length. Whereby, this is most wasteful and not cost effective. Therefore, there is a need to provide a suitable coupling that is functional for interconnecting remnants of micro-duct. Currently there are no suitable couplings available to resolve this problem.

Various types of couplings have been conceived and utilized for numerous purposes. The related prior art includes U.S. Pat. No. 5,947,532 issued to Lorenz shows prior art of a "stab" type coupling. The conduit ends are inserted ("stabbed") into a structure that contains a flexible collet. The collet is supported by an inclined surface in the structure in such a way as to permit insertion of the conduit into the structure, but prevents retraction. No tools are required for installation. However, after the conduit is inserted, it must be retracted some finite distance in order to activate the bite of the collet into the conduit. This is an obstacle in certain installations. Further, this coupling cannot be removed from the conduit without destroying the coupling or damaging the conduit.

Further examples of related prior art include U.S. Pat. No. 7,125,056 issued to Saarem, U.S. Pat. No. 2,913,262 issued to De Cenzo et al, U.S. Pat. No. 4,008,937 issued to Filippi, U.S. Pat. No. 4,346,428 issued to Gale, and U.S. Pat. No. 5,380,052 issued to Hendrickson all of which are couplings that utilize a toggle clamp to couple conduits. All of these examples require preparing the conduit ends with beads, threaded adaptors, grooves and the like. Therefore, the noted techniques would not be desirable or accepted in the field of the present invention.

The noted prior art couplings are suitable for their intended use. However, none are functional for interconnecting micro-duct remnants as each are much too large and more importantly due to their shape they cannot be easily pulled through a conduit as they each have protruding components which tend to become snagged. Also, being micro-ducts are bundled side-by-side there is limited space there between. Therefore, the noted couplings cannot be utilized as there is not enough space for the coupling between each micro-duct when bundled. Still further, prior art couplings include internal gripping teeth which can damage the micro-duct. Also, once installed they are difficult to remove and are not re-usable.

Therefore, there is a great need for a micro-duct reclamation coupling that is sleek, small, of simple construction and most importantly free from any protruding components.

SUMMARY OF THE INVENTION

The present invention is exceptionally advantageous for numerous reasons and recognizes, addresses, and resolves the problematic issues associated with the prior art in a manner heretofore not taught. The new and unusual results are achieved due to the construction of the compression coupling and internal components. The design is of simple construction requiring only four components and no tools are required for installation or removal. The internal side walls are smooth and will not damage the micro-duct or the bundled fiber optics contained therein. The interconnecting ends of the micro-duct are easily aligned, remain attached when subjected to pulling forces, and can be easily pulled or air-forced through the surrounding conduit. Also, if for any reason disconnection of the interconnected ends of the micro-duct is desired, the coupling is easily removed and is reusable.

Objects and Advantages of the Invention

It is therefore a primary object of the present invention to provide a new micro-duct reclamation compression coupling which eliminates the problematic issues of the known prior art. For example, there are no external protruding elements, is of simple construction, no need for clamps, is sleek, smooth, is not damaging, requires no tools for installation or removal and is reusable.

Another object of the present invention to provide a new micro-duct reclamation compression coupling which is cost effective to manufacture, market and sell.

Yet a further object of the present invention is to provide a new micro-duct reclamation compression coupling which is of simple construction requiring only four components.

Other objects and advantages will become apparent when taken into consideration with the following specification and drawings.

BRIEF DESCRIPTION OF THE DRAWINGS

FIG. 2 is respectively a front view of the micro-duct reclamation compression coupling when thread ably engaged including the micro-duct interconnected ends contained therein.

DETAILED DESCRIPTION OF THE DRAWINGS

Figure 1:
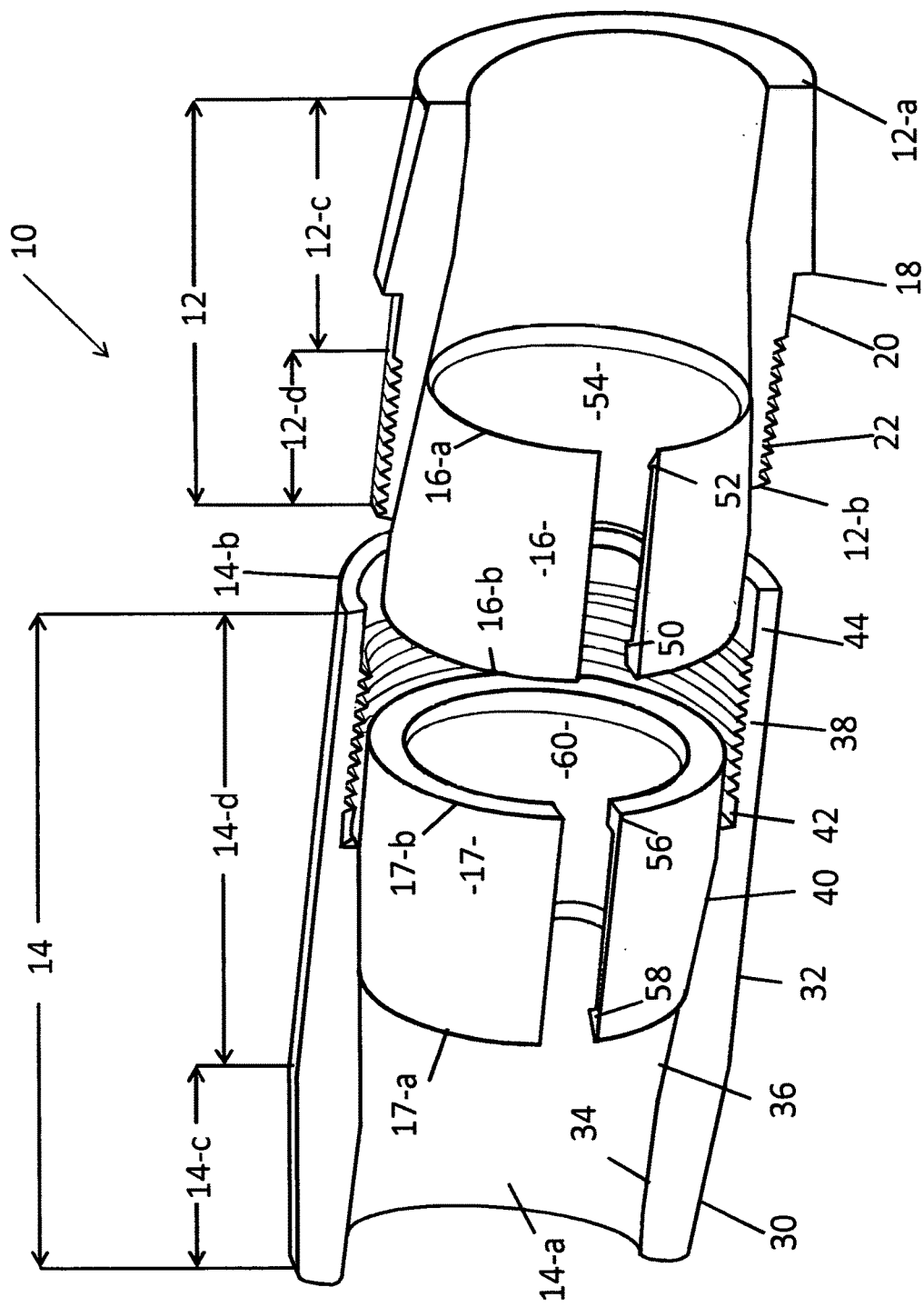
FIG. 1 is respectively a perspective cut-away view depicting the internal components of a first embodiment for the present invention.

Referring now in detail to the drawings wherein like elements refer to like characters throughout the various views. As depicted in FIG. 1, (10) represents an overview for the sleeved compression micro-duct reclamation coupling of the present invention which includes an elongated tubular male half section (12), an elongated tubular female half section (14), a first elongated slotted compression sleeve (16) and a second elongated slotted compression sleeve (17). The elongated tubular male half section (12) having a first end (12-a), a second end (12-b), a first segment (12-c) and a second segment (12-d). The "external" structure of the elongated tubular male half section (12) is described as follows. Wherein the first segment (12-c) having an external surface area that is slightly ramped upwardly outwardly toward the second end (12-b) forming a slightly protruding external rim (18) of which intersects with an integrally formed smooth exterior surface area (20). The second segment (12-d) having external threads (22) extending from the second end (12-b) and terminating at the integrally formed smooth exterior surface area (20).

The "internal" structure of the elongated tubular male half section (12) is described as follows. The first segment (12-c) having an internal surface area (24) that is slightly ramped upwardly inwardly toward an internal surface area (26) of the integrally formed smooth exterior surface area (20). The second segment (12-d) having an internal surface area (28) that is slightly ramped upwardly inwardly toward the internal surface area (26) of the integrally formed smooth exterior surface area (20). The internal surface area (24) of the first segment (12-c) merges with said internal surface area (26) of the second segment (12-d).

The elongated tubular female half section (14) having a first end (14-a), a second end (14-b), a first segment (14-c) and a second segment (14-d). The "external" structure of the elongated tubular female half section (14) is described as follows. The first segment (14-c) of the elongated tubular female half section (14) having an external surface area (30) that is slightly tapered inward toward the first end (14-b) of the elongated tubular female half section (14). The second segment (14-d) of the elongated tubular female half section (14) having an external surface area (32) which extends linearly to the second end (14-b) of the elongated tubular female half section (14). The external surface area (30) of the first segment (14-c) of the elongated tubular female half section (14) merges with the external surface area (32) of the second segment (14-d) of the elongated tubular female half section (14).

The "internal" structure of the elongated tubular female half section (14) is described as follows. The first segment (14-c) having an internal surface area (34) that is slightly ramped upwardly inwardly toward the second segment (14-d) of the elongated tubular female half section (14). The second segment (14-d) of the elongated tubular female half section (14) having an internal surface area (36) that is slightly ramped downwardly away from the first segment (14-d) of the elongated tubular female half section (14) of which extends to the second end (14-b) of the elongated tubular female half section (14). The internal surface area (34) of the first segment (14-c) of the elongated tubular female half section (14) merges with the internal surface area (36) of the second segment (14-d) of the elongated tubular female half section (14). The internal surface area (36) of the second segment (14-d) of the elongated tubular female half section (14) having an internally threaded section (38). The internal surface area (36) of said second segment (14-d) of the elongated tubular female half section (14) having a smooth section (40) which terminates into a recessed cavity (42) formed between the smooth section (40) and the internally threaded section (38). The internally threaded section (38) terminating before the second end (14-b) forming an internal circular smooth surface (44) which terminates at the second end (14-b) of the elongated tubular female half section (14).

The second segment (12-d) of the elongated tubular male half section (12) being of a shape and size to slideably receive and retain the first elongated slotted compression sleeve (16) therein. The second segment (14-d) of the elongated tubular female half section (14) being of a shape and size to slideably receive and retain the second elongated slotted compression sleeve (17) therein. The first elongated slotted compression sleeve (16) being of a shape and size to slideably receive and retain an end (46-a) of a first micro-duct conduit (46) therein. The second elongated slotted compression sleeve (17) being of a shape and size to slideably receive and retain an end (48-a) of a second micro-duct conduit (48) therein and the external threads (22) and the internally threaded section (38) have a mating relationship when thread ably engaged together. Note, each micro-duct conduit (46 & 48) is only shown in FIG. 2. Also, the internal components of the sleeved compression micro-duct coupling (10) are only depicted in FIG. 1 (not shown in FIG. 2) for clarity purposes.

The first elongated slotted compression sleeve (16) further having a first end (16-a), a second end (16-b), an internal inwardly protruding rim (50), an internal inwardly upwardly sloped pointed ridge (52) and an internal intersecting surface area (54). The first end (16-a) is opposed and spaced apart from the second end (16-b). The first end (16-a) is shaped to form the internal inwardly upwardly sloped pointed ridge (52). The second end (16-b) is shaped to form the internal inwardly protruding rim (50). The internal inwardly upwardly sloped pointed ridge (52) is spaced apart from the internal inwardly protruding rim (50) by the internal intersecting surface area (54). The internal inwardly protruding rim (50) functions as a stop means for the end (46-a) of the first micro-duct conduit (46).

The second elongated slotted compression sleeve (17) further having a first end (17-a), a second end (17-b), an internal inwardly protruding rim (56), an internal inwardly upwardly sloped pointed ridge (58) and an internal intersecting surface area (60). The first end (17-a) of the second elongated slotted compression sleeve (17) is opposed and spaced apart from the second end (17-b) of the second elongated slotted compression sleeve (17). The first end (17-a) of the second elongated slotted compression sleeve (17) is shaped to form the internal inwardly upwardly sloped pointed ridge (58) of the second elongated slotted compression sleeve (17). The second end (17-b) of the second elongated slotted compression sleeve (17) is shaped to form the internal inwardly protruding rim (56) of the second elongated slotted compression sleeve (17). The internal inwardly upwardly sloped pointed ridge (58) of the second elongated slotted compression sleeve (17) is spaced apart from the internal inwardly protruding rim (56) of the second elongated slotted compression sleeve (17) by the internal intersecting surface area (60) of the second elongated slotted compression sleeve (17). The internal inwardly protruding rim (56) of the second elongated slotted compression sleeve (17) functions as a stop means for the end (48-a) of the second micro-duct conduit (48) and each internal inwardly upwardly sloped pointed ridge (52 & 58) function as a grip means for securing each micro-duct conduit (46 & 48) in a fixed position.

Therefore it can now be seen, during the micro-duct reclamation conduit attachment process the workman first inserts and pushes each of the micro-duct reclamation ends (46-a) and (48-a) simultaneously into the sleeved compression micro-duct reclamation coupling (10) until the micro-duct ends (46-a) and (48-a) become aligned and engage each of the stop means, namely each internal inwardly protruding rim (50 & 56) and cannot be inserted or pushed any further. Whereby, thereafter when the elongated tubular female half section (14) and the elongated tubular male half section (12) are thread ably gradually engaged, each elongated slotted compression sleeve (16 & 17) gradually gently but firmly contracts which in turn simultaneously results in a gradual compression force exerted upon the end (46-a) of the first micro-duct reclamation conduit (46) and the end (48-*a*) of the second micro-duct conduit (48). Furthermore, during the compression process each of the grip means, namely each internal inwardly upwardly sloped pointed ridge (52 & 58) simultaneously grip into each of the micro-duct conduits (46 & 48). It is to be noted due to the micro-duct's flexibility the grip means will not damage the micro-duct but stabilizes it in a firm position. Whereas when the elongated tubular female half section (14) and the elongated tubular male half section (12) are fully thread ably engaged, (as depicted in FIG. 2) the second end (14-*b*) of the elongated tubular female half section (14) has a mating relationship with the slightly protruding external rim (18). Thus, when the sleeved compression micro-duct reclamation coupling (10) is installed and completely engaged, the elongated tubular female half section (14), the elongated tubular male half section (12), the end (46-*a*) of the first micro-duct reclamation conduit (46) and the end (48-*a*) of the second micro-duct reclamation conduit (48) are removeably, fixedly, inner connected together.

It is to be understood the sleeved compression micro-duct reclamation coupling of the present invention can be of any size of engineering choice and made from any suitable material of engineering choice. However, for exemplary purposes the size may vary between 4 to 18 mm and one suitable material of choice is 6061 T6 aluminum or the like.

It can now be seen the applicants have herein provided a new and novel sleeved compression micro-duct reclamation coupling which has heretofore not be conceived or taught within the known prior art. The invention is of simple construction and provides an efficient means for interconnecting micro-duct remnants of which has not been suggested, addressed, nor previously recognized.

Although the invention has been herein shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatuses.

Having described the invention, what we claim as new and desire to secure by Letters Patent is:

1. A sleeved compression micro-duct reclamation coupling comprising:

an elongated tubular male half section;
an elongated tubular female half section;
a first elongated slotted compression sleeve;
a second elongated slotted compression sleeve;
said elongated tubular male half section having a first end; a second end; a first segment; and a second segment; said first segment having an external surface area that is slightly ramped outwardly toward said second end forming a slightly protruding external rim of which intersects with an integrally formed smooth exterior surface area, said second segment having external threads terminating at said integrally formed smooth exterior surface area, said first segment having an internal surface area that is slightly ramped upwardly inwardly toward an internal surface area of said integrally formed smooth exterior surface area, said second segment having an internal surface area that is slightly ramped upwardly inwardly toward said internal surface area of said integrally formed smooth exterior surface area, said internal surface area of said first segment merges with said internal surface area of said second segment, said elongated tubular female half section having a first end; a second end; a first segment; and a second segment; said first segment of said elongated tubular female half section having an external surface area that is slightly tapered toward said first end of said elongated tubular female half section, said second segment of said elongated tubular female half section having an external surface area which extends linearly to said second end of said elongated tubular female half section, said external surface area of said first segment of said elongated tubular female half section merges with said external surface area of said second segment of said elongated tubular female half section, said first segment having an internal surface area that is slightly ramped upwardly inwardly toward said second segment of said elongated tubular female half section, said second segment of said elongated tubular female half section having an internal surface area that is slightly ramped downwardly away from said first segment of said elongated tubular female half section of which extends to said second end of said elongated tubular female half section, said internal surface area of said first segment of said elongated tubular female half section merges with said internal surface area of said second segment of said elongated tubular female half section, said internal surface area of said second segment of said elongated tubular female half section having an internally threaded section, said internal surface area of said second segment of said elongated tubular female half section having a smooth section which terminates into a recessed cavity formed between said smooth section and said internally threaded section, said internally threaded section terminating before said second end forming an internal circular smooth surface which terminates at said second end, said second segment of said elongated tubular male half section being of a shape and size to slideably receive and retain said first elongated slotted compression sleeve therein, said second segment of said elongated tubular female half section being of a shape and size to slideably receive and retain said second elongated slotted compression sleeve therein, said first elongated slotted compression sleeve being of a shape and size to slideably receive and retain an end of a first micro-duct conduit therein, said second elongated slotted compression sleeve being of a shape and size to slideably receive and retain an end of a second micro-duct conduit therein, said external threads and said internally threaded section have a mating relationship when threadably engaged together, said first elongated slotted compression sleeve further having a first end; a second end; an internal inwardly protruding rim; an internal inwardly upwardly sloped pointed ridge; and an internal intersecting surface area; said first end being opposed to said second end, said first end being shaped to form said internal inwardly upwardly sloped pointed ridge, said second end being shaped to form said internal inwardly protruding rim, said internal inwardly upwardly sloped pointed ridge being spaced apart from said internal inwardly protruding rim by said internal intersecting surface area, said internal inwardly protruding rim functions as a stop means for said end of said first micro-duct conduit, said second elongated slotted compression sleeve further having a first end; a second end; an internal inwardly protruding rim; an internal inwardly upwardly sloped pointed ridge; and an internal intersecting surface area; said first end of said second elongated slotted compression sleeve being opposed to said second end of said second elongated slotted compression sleeve, said first end of said second elongated slotted compression sleeve being shaped to form said internal inwardly upwardly sloped pointed ridge of said second elongated slotted compression sleeve, said second end of said second elongated slotted compression sleeve being shaped to form said internal inwardly protruding rim of said second elongated slotted compression sleeve, said internal inwardly upwardly sloped pointed ridge of said second elongated slotted compression sleeve being spaced apart from said internal inwardly protruding rim of said second elongated slotted compression sleeve by said internal intersecting surface area of said second elongated slotted compression sleeve, said internal inwardly protruding rim of said second elongated slotted compression sleeve functions as a stop means for said end of said second micro-duct conduit and each said internal inwardly upwardly sloped pointed ridge functions as a grip means for securing each said micro-duct conduit in a fixed position, whereby:

when said elongated tubular female half section and said elongated tubular male half section are threadably gradually engaged, each said elongated slotted compression sleeve gradually contracts which in turn simultaneously results in a gradual compression force exerted upon said end of said first micro-duct conduit and said end of said second micro-duct conduit, when said elongated tubular female half section and said elongated tubular male half section are fully threadably engaged said second end of said elongated tubular female half section has a mating relationship with said slightly protruding external rim, thus removeably fixedly inner connecting said elongated tubular female half section with said elongated tubular male half section with said an end of said first micro-duct conduit and said an end of said second micro-duct conduit together.

\* \* \* \* \*